United States Patent
Duffey et al.

(10) Patent No.: US 11,660,699 B2
(45) Date of Patent: May 30, 2023

(54) JOINING OF AL-SI COATED PRESS HARDENED STEEL USING FLASH BUTT WELDING

(71) Applicant: AK Steel Properties, Inc., West Chester, OH (US)

(72) Inventors: Matthew James Duffey, Mason, OH (US); Steven Wayne Streibick, Middletown, OH (US)

(73) Assignee: CLEVELAND-CLIFFS STEEL PROPERTIES INC., West Chester, OH (US)

( * ) Notice: Subject to any disclaimer, the term of this patent is extended or adjusted under 35 U.S.C. 154(b) by 391 days.

(21) Appl. No.: 16/839,275

(22) Filed: Apr. 3, 2020

(65) Prior Publication Data

US 2020/0316709 A1    Oct. 8, 2020

Related U.S. Application Data

(60) Provisional application No. 62/829,891, filed on Apr. 5, 2019.

(51) Int. Cl.
*B23K 20/00* (2006.01)
*B23K 20/02* (2006.01)

(52) U.S. Cl.
CPC .......... *B23K 20/028* (2013.01); *B23K 20/002* (2013.01)

(58) Field of Classification Search
CPC ............................ B23K 11/163; B23K 11/3009
See application file for complete search history.

(56) References Cited

U.S. PATENT DOCUMENTS

| | | | |
|---|---|---|---|
| 1,456,597 A * | 5/1923 | Hughes | B21K 1/761 72/364 |
| 5,828,032 A | 10/1998 | Krzys et al. | |
| 8,307,680 B2 | 11/2012 | Drillet et al. | |
| 8,614,008 B2 | 12/2013 | Canourgues et al. | |
| 9,321,132 B2 | 4/2016 | Briand et al. | |
| 9,604,311 B2 | 3/2017 | Evangelista et al. | |
| 9,708,683 B2 | 7/2017 | Drillet et al. | |
| 10,550,447 B2 | 2/2020 | Drillet et al. | |

FOREIGN PATENT DOCUMENTS

| | | |
|---|---|---|
| DE | 202007018832 | 10/2009 |
| EP | 2942143 | 11/2015 |
| JP | S59-118282 | 7/1984 |
| JP | S61-099585 | 5/1986 |
| JP | S63-16874 A | 1/1988 |
| JP | 2012-0130931 | 7/2012 |

(Continued)

OTHER PUBLICATIONS

Delta; http://www.deltarr.com/flash-butt-welding-services/; Oct. 14, 2017 (Year: 2017).*

(Continued)

*Primary Examiner* — Erin B Saad
(74) *Attorney, Agent, or Firm* — Frost Brown Todd LLP

(57) ABSTRACT

A process for joining steel plate includes providing a steel plate and joining the steel plate to another material. The steel plate includes at least one surface having an Al—Si coating. The step of joining the steel plate to another material is performed while the steel plate is in an as-coated condition. Joining is performed using a forging process.

4 Claims, 12 Drawing Sheets

(56) References Cited

FOREIGN PATENT DOCUMENTS

| | | |
|---|---|---|
| KR | 2013-0050416 A | 5/2013 |
| KR | 20170123551 A | 11/2017 |
| MX | 292836 | 11/2011 |

OTHER PUBLICATIONS

International Search Report and Written Opinion dated Jul. 28, 2020 for Application No. PCT/US2020/026493, 14 pages.
Chinese Office Action dated Jun. 21, 2022 for Application No. 202080026639.0, 16 pages.

* cited by examiner

US 11,660,699 B2

JOINING OF AL-SI COATED PRESS HARDENED STEEL USING FLASH BUTT WELDING

PRIORITY

This application claims priority to U.S. Provisional Application Serial No. 62/829,891, entitled JOINING OF AL-SI COATED PRESS HARDENED STEEL USING FLASH BUTT WELDING, filed on Apr. 5, 2019, the disclosure of which is incorporated by reference herein.

BACKGROUND

Steel plates can be joined using a variety of welding processes and in a variety of contexts. In some contexts, such steel plates can be subjected to hot-dip coating prior to welding to adhere a variety of metallic coatings to one or more surfaces of the steel plates. Hot-dip coating prior to welding may be desirable in contexts where steel plates having different coating properties are joined. For instance, tailor welded blanks can be made by joining multiple sheets of different alloys having different thicknesses, coating properties, and/or material properties. Once all the sheets are joined, a blank is formed that can be subsequently stamped or drawn into a predetermined shape. Although this process can provide many advantages, joining materials in the as-coated condition can lead to challenges with maintaining suitable formability, ductility, and strength where the materials are joined.

Al—Si coated press hardened steel plates or sheets can be joined using laser welding or other suitable welding processes. However, challenges may arise with respect to aluminum in the coating of the press hardened steel. In particular, during the welding process, aluminum will incidentally mix with the press hardened steel substrate in the weld fusion zone. Because aluminum tends to stabilize ferrite, mixing of aluminum in the weld fusion zone can lead to formation of ferrite in the weld fusion zone. Although the presence of ferrite is not entirely undesirable, in excessive concentrations, the presence of ferrite can reduce the ductility and strength of the weld fusion zone of a final host stamped part.

In some context, aluminum concentrations in the weld fusion zone can be reduced through adequate joint preparation. For instance, laser ablation can be used to remove the Al—Si coating. Alternatively, aluminum concentrations in the weld fusion zone can be reduced through methods of aluminum dilution such as through the use of filler metals during welding. However, in some contexts, both approaches may be undesirable due to imprecision in either process, increased production times, and/or increased production costs. Thus, there is a need to develop devices and methods to reduce the propensity of aluminum to enter the weld fusion zone during welding of Al—Si coated press hardened steels. While several devices and methods have been made and used in the context of steel manufacturing, it is believed that no one prior to the inventor has made or used the invention described in the appended claims.

DETAILED DESCRIPTION

Laser welding processes can be used to join Al—Si coated press hardened steel (PHS) while such press hardened steels are in the as-coated condition. Although laser welding processes may be desirable for many reasons such as high productivity, low heat input, and low distortion, a drawback of laser welding processes in the context of joining Al—Si coated press hardened steel is that relatively low strength welds can result. Such low strength welds are believed to be due to mixing of aluminum into the weld fusion zone. For instance, aluminum is generally considered a ferrite stabilizing element. Although the presence of some ferrite can be tolerated, in excess concentrations, the ferrite can lead to low weld strength compared to the base material. Thus, the presence of aluminum in the weld leads to low strength regions in the weld fusion zone. This low strength can manifest in the form of poor formability and reduced strength. Accordingly, it should be understood that the presence of aluminum in the weld fusion zone may be undesirable in some examples.

Figure 1:
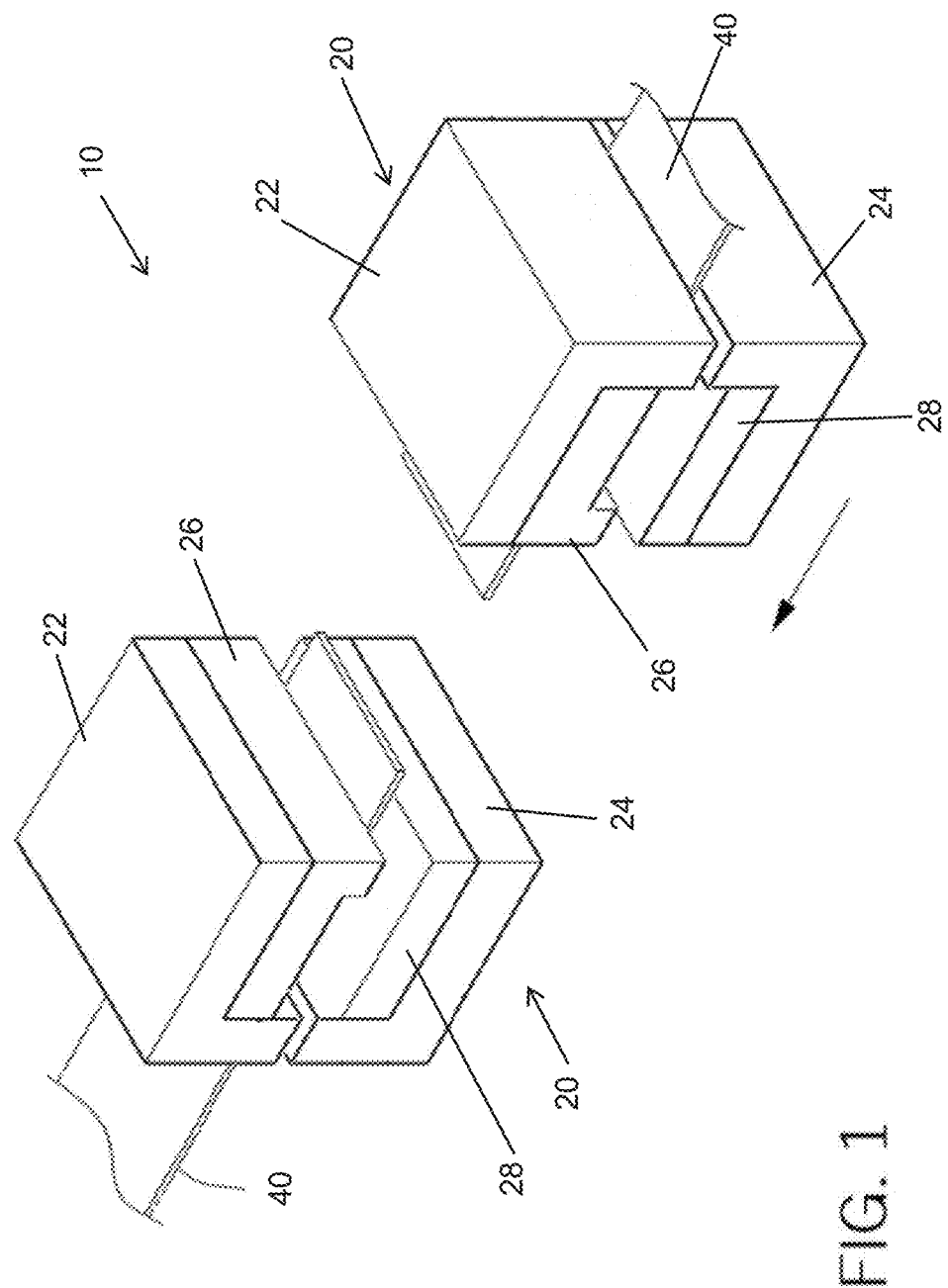
FIG. 1 depicts a perspective view of an exemplary welding system.

In the present example, a flash butt welding process is used to generally reduce the presence of aluminum in the weld fusion zone when joining Al—Si coated steel plates. Although the description herein refers to steel plate, it should be understood that the term "plate" is intended to encompass various forms of steel including, by way of example only, steel sheet. FIG. 1 shows an exemplary flash butt welding system (10) schematically. In the present example, the flash butt welding system (10) includes opposingly oriented plate clamps (20). Each plate clamp (20) is configured to clamp a corresponding steel plate (40) along a horizontal axis. One or both of the opposed plate clamps (20) can be configured to move the steel plates toward each other along the horizontal axis. Although plate clamps (20) of the present example are shown and described herein as being substantially the same, it should be understood that in other examples, the particular configuration of each plate clamp (20) can be varied according to a variety of considerations. In addition, although certain components of each plate clamp (20) are shown as having a specific shape or geometric configuration, it should be understood that in other examples, the particular shape or geometric configuration of each individual component of each plate clamp (20) can be varied.

As can be seen, each clamp (20) includes an upper clamp arm (22), a lower clamp arm (24), an upper electrode (26), and a lower electrode (28). Clamp arms (22, 24) are generally configured to operate cooperatively to move towards each other to clamp an individual steel plate (40) therebetween. One or both clamp arms (22, 24) can then move towards each other to bring the steel plates (20) into contact. Although not shown, it should be understood that welding system (10) can be configured to include various actuators such as a hydraulically actuated piston, a linear actuator, a motor, a lead screw, and/or etc. to move each clamp arm (22, 24), or one clamp arm (22, 24) while the other remains stationary.

The interior portion of each clamp arm (22, 24) includes upper electrode (26) and lower electrode (28), respectively. Each electrode (26, 28) is thus positioned between clamp arm (22, 24) and steel plate (40) such that each electrode (26, 28) is generally configured to engage steel plate (40) directly. As will be described in greater detail below, each electrode (26, 28) is generally configured to provide an electric current to steel plate (40) to induce resistive heat within steel plate (40) for welding. Although each arm (22, 24) of the present example includes a corresponding electrode (26, 28), it should be understood that in other examples, only a single arm (22, 24) may be equipped with electrode. Alternatively, in other examples, a wire coil can be used in lieu of electrodes (26, 28) to provide induction heating rather than resistive heating.

Figure 2:
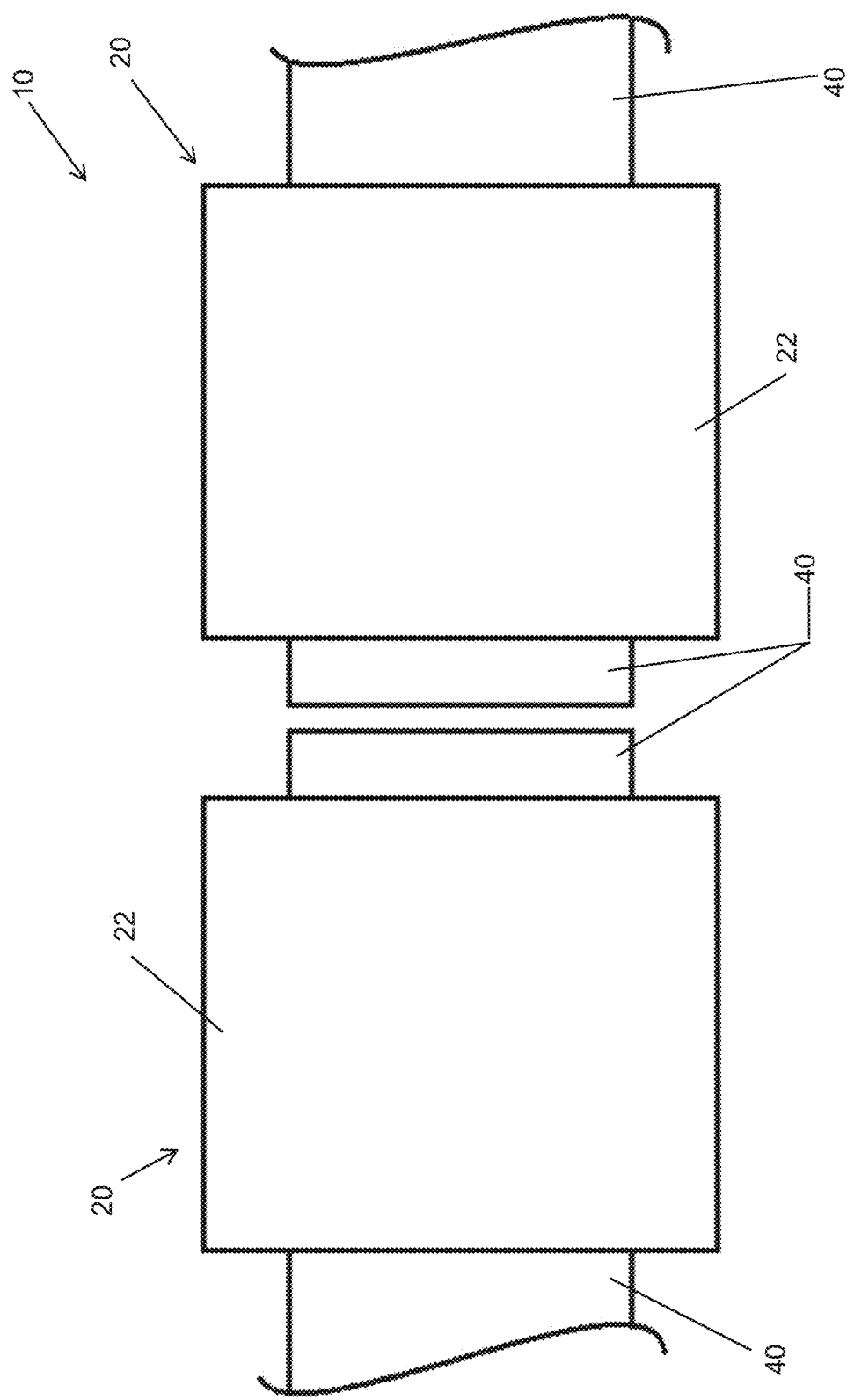
FIG. 2 depicts a top plan view of the welding system of FIG. 1, with a pair of steel plate oriented for performing a flash butt weld.
Figure 3:
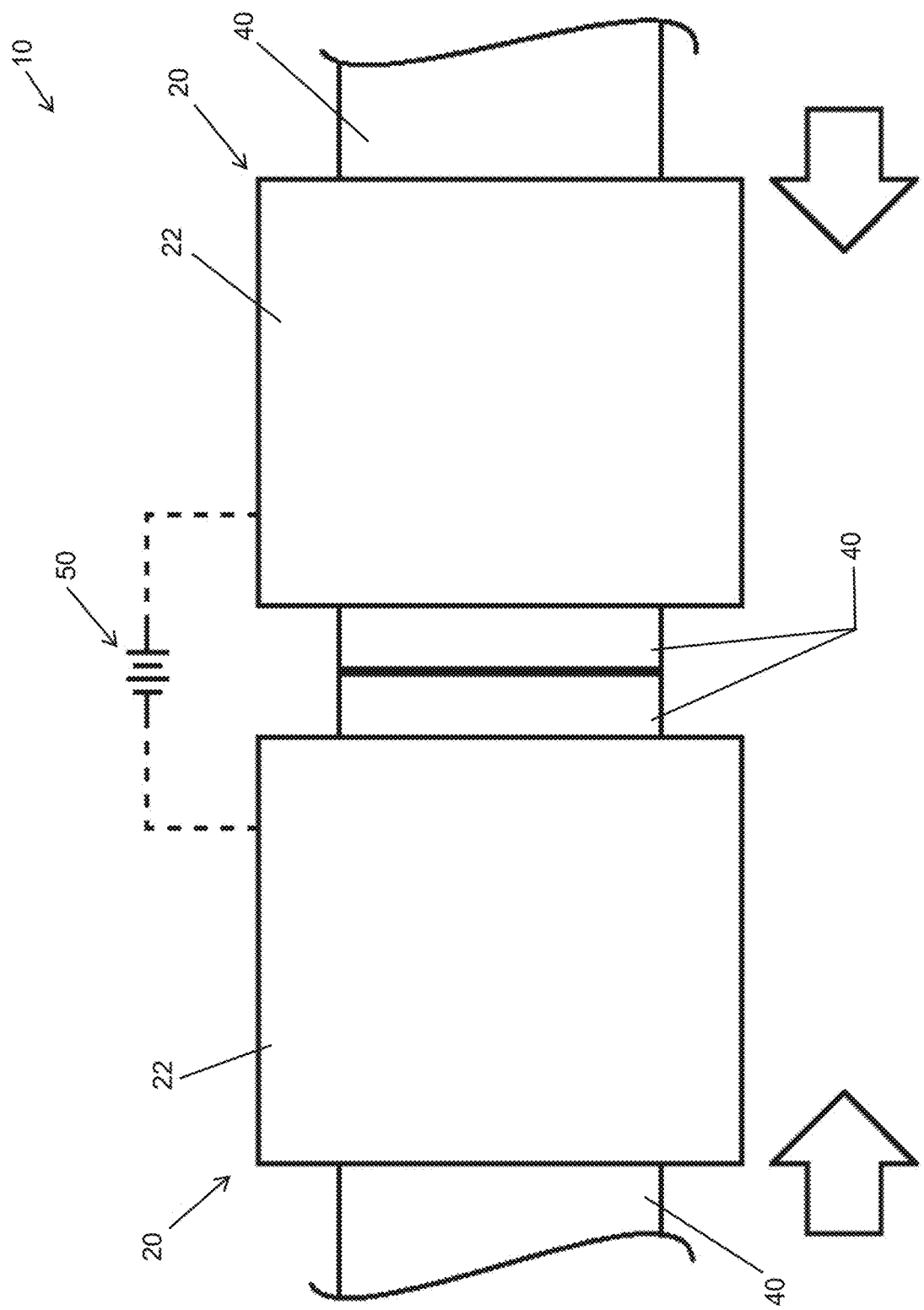
FIG. 3 depicts another top plan view of the welding system of FIG. 1, with the pair of steel plates of FIG. 2 being joined.

FIGS. 2 and 3 show an exemplary use of welding system (10). As can be seen in FIG. 2, the welding process begins with steel plates (40) separated, but oriented in a side-by-side configuration to form a butt weld between steel plates (40). In this configuration, the particular surface for each steel plate (40) that will be welded is facing the other steel plate (40). It should be understood that at this stage, steel plates (40) are in the as-coated condition such that at least one surface of one or more a steel plate (40) includes an Al—Si coating. As will be described in greater detail below, joint preparation is generally not required because the welding process will cause aluminum, oxides, contaminants, impurities, and other undesirable surface constituents to be pushed from the weld fusion zone and into flash.

To initiate welding, one or both clamps (20) are moved toward the other clamp (20) to bring each steel plate (40) into contact with the other steel plate (40). As can be seen in FIG. 3, during this movement, a power source (50) is energized prior to the two steel plates (40) touching. Upon touching, electrical current flows from power source (50) and through steel plates (40) via electrodes (26, 28). Although the power source (50) of the present example is shown as a direct current power source, it should be understood that in other examples various other power sources can be used including alternating current, pulsed current, multi-phased alternating or direct current, and/or etc.

Regardless of the particular power source (50) used, it should be understood that power source (50) is generally configured to provide high current which generates heat at the mating surface of each steel plate (40). This current is applied to render the area at and near the mating surface of each steel plate (40) plastic in character. As plasticity develops, one or both clamps (20) is moved towards each other to apply pressure to the joint between steel plates (40). This pressure results in forging between the steel plates (40). The term forging used herein generally refers to a solid-state form of welding that uses pressure and plastic deformation to join weld surfaces via a diffusion mechanism. It should be understood that during forging, all surface oxides and impurities are squeezed out of the weld and into flash. This squeezing action also includes elements of the Al—Si coating. With elements of the Al—Si coating being forged out of the weld, little to no aluminum can mix in the weld fusion zone.

After welding is complete, the joined steel plates (40) can be released from clamps (20) and are permitted to cool. Optionally, the flash generated during welding can be removed using scarfing. Scarfing in the present example generally refers to the physical removal of the flash. Such physical removal can be accomplished by a variety of processes depending on the particular physical characteristics of the flash. For instance, in some examples a hard carbide scarfing tool can be used to manually scrape the flash from the weld. For more robust flash, other tools can be used such as pneumatic chippers or grinders. In still other examples, manual or semi-automatic oxyacetylene touches or plasma cutters can be used to remove the flash from the weld.

EXAMPLE 1

Welds were prepared using the welding system (10), described above, as an initial proof of concept. In particular, three welds were performed with each weld joining a 0.047" thick press hardened steel coupon to a 0.059" thick press hardened steel coupon. Each coupon was 4" wide by 6" long such that each weld formed a 4" wide by 12" long final coupon.

Figure 4:
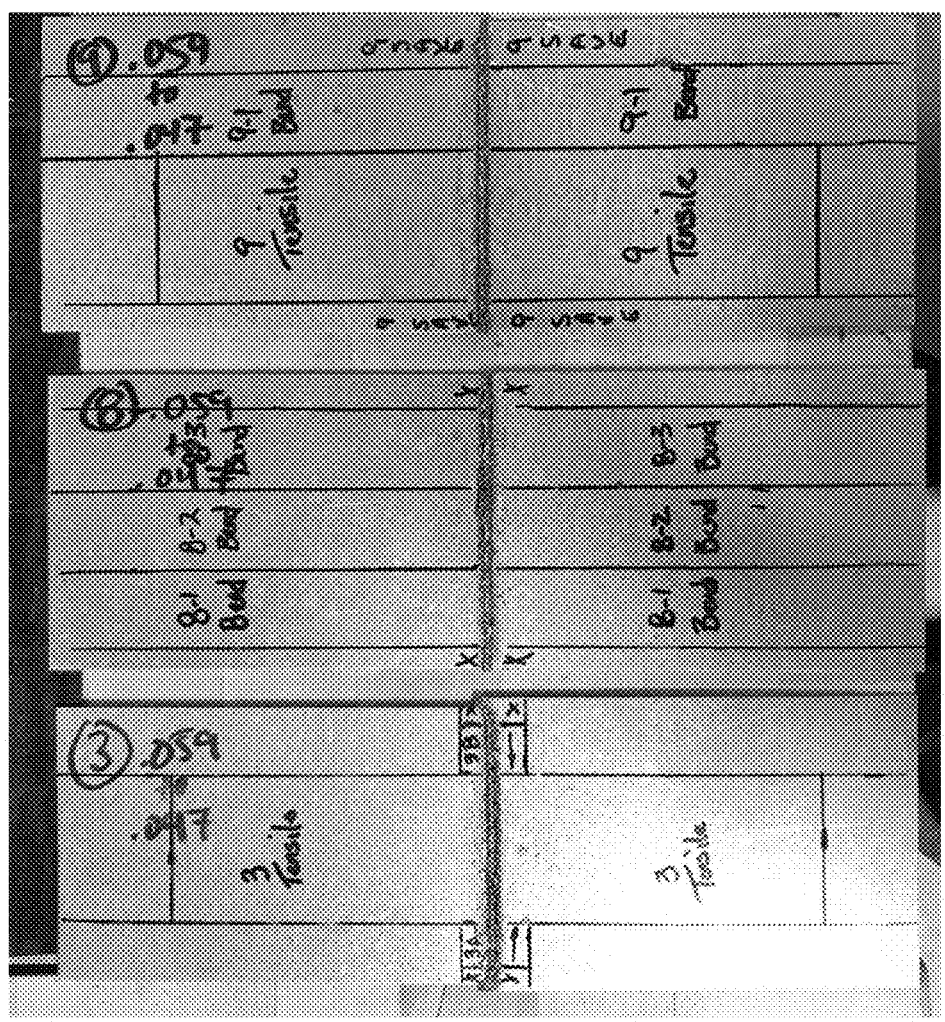
FIG. 4 depicts an image of welds formed using flash butt welding.

FIG. 4 shows the resulting three welds. As can be seen, the material was joined successfully using the flash butt welding process. However, some material overlap was observed. It was believed this material overlap was due to excessive material stick-out (e.g., the distance between the clamp and the weld).

EXAMPLE 2

Additional welds were prepared using the welding system (10) described above.

Figure 5:
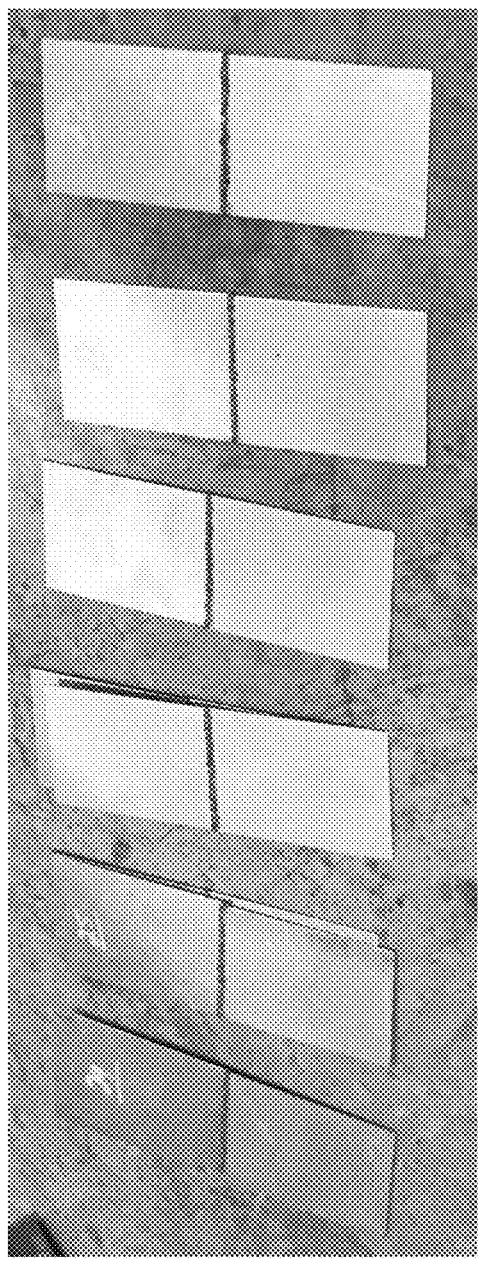
FIG. 5 depicts another image of welds formed using flash butt welding.

In particular, two Al—Si coated press hardened steel plates were joined using flash butt welding. Coupon dimensions were generally identical to those in Example 1. In particular, 0.047" thick weld coupons were joined with 0.059" thick coupons. Due to observations made in Example 1, material stick-out was reduced. It was observed during welding that the reduced material stick-out provided increased support from the clamps, thereby reducing material weld overlap. After welding, the welds were sectioned both prior to scarfing and after scarfing (e.g., before and after removal of flash). FIG. 5 shows an image of the completed welds.

Figure 6:
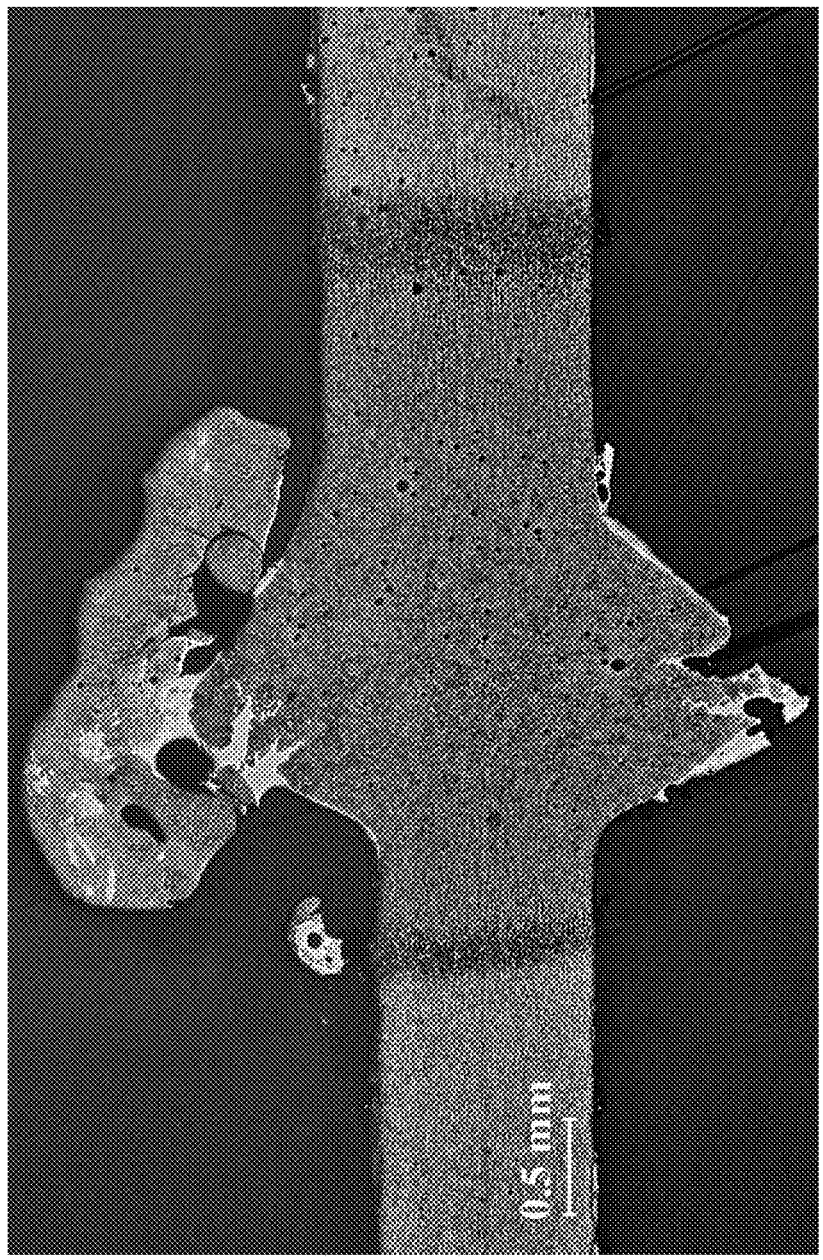
FIG. 6 depicts a photomicrograph of a weld cross-section, the weld formed using flash butt welding.

Photomicrographs were prepared using the sections that were prepared after flash butt welding. In particular, FIG. 6 shows a photomicrograph of two Al—Si coated steel plates joined by flash butt welding prior to any removal of flash by scarfing. In FIG. 6, aluminum-rich regions of the weld are visible as lighter (or "white") regions, while aluminum free regions of the weld are darker in character. As can be seen, aluminum-rich regions have been generally pushed or otherwise moved towards the extremities of the weld or into the flash.

Figure 7:
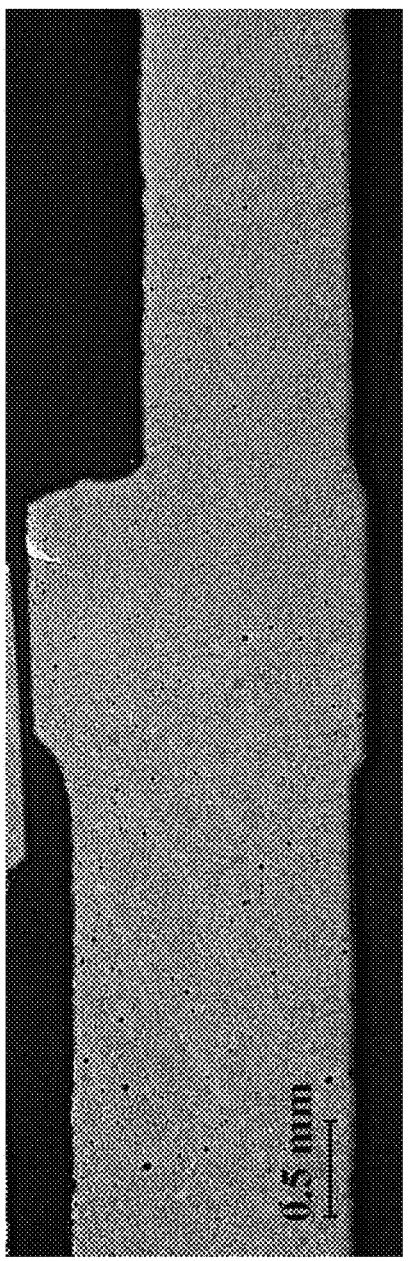
FIG. 7 depicts another photomicrograph of a weld cross-section, the weld formed using flash butt welding and the flash removed.

FIG. 7 shows a photomicrograph of two Al—Si coated steel plates joined by flash butt welding after removal of flash by scarfing. As with FIG. 6 discussed above, aluminum-rich regions of the weld are visible as lighter regions, while aluminum free regions of the weld are darker in character. As can be seen, aluminum-rich regions have been generally removed by scarfing. Any remaining aluminum-rich regions are oriented at the extremity of the weld. It should be understood that all remaining aluminum-rich regions shown in FIG. 7 are still considered to be a part of the flash of the weld. Thus, although FIG. 7 shows some aluminum-rich regions, it should be understood that such regions would be removed entirely in a production environment due to further scarfing and/or removal of flash.

EXAMPLE 3

Additional welds were prepared for comparison purposes to the welds prepared in Example 2. In particular, two Al—Si coated steel plates were joined using a laser welding process. The laser welding was performed without filler material. In other words, the welds were performed with straight laser welding. After welding, the welds were sectioned. Unlike the welds described above in Example 2, scarfing was unnecessary for the welds performed here because laser welding generally does not produce flash.

Figure 8:
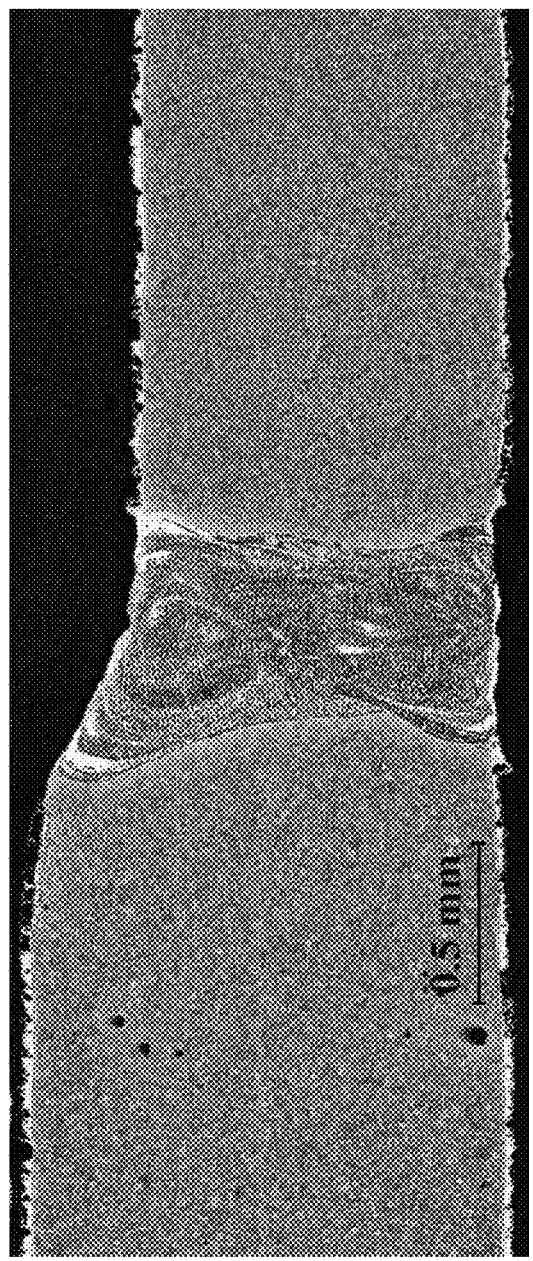
FIG. 8 depicts still another photomicrograph of a weld cross-section, the weld formed using laser welding.
Figure 9:
FIG. 9 depicts yet another photomicrograph of a weld cross-section, the weld formed using laser welding.

Photomicrographs were prepared using the sections that were prepared after laser welding. In particular, FIGS. 8 and 9 show photomicrographs of two Al—Si coated steel plates joined by laser welding. As similarly described above, aluminum-rich regions of the weld are visible as lighter (or "white") regions, while aluminum free regions of the weld are darker in character. As can be seen, aluminum-rich regions are generally dispersed throughout the weld fusion zone. Unlike the welds discussed above, the welds here have limited segregation of aluminum-rich regions towards the extremity of the welds. Thus, the welds performed in the present example are generally not as strong and ductile relative to the welds performed in Example 2 due to the presence of aluminum-rich regions in the weld fusion zone.

EXAMPLE 4

Additional welds were prepared on production flash butt welding equipment to test performance in a production environment. Welding was performed with aluminum coated press hardened steel material having a width of 56" and a thickness of 0.080". Weld quality was acceptable.

EXAMPLE 5

Additional welds were prepared on production flash butt welding equipment similar to welds prepared in Example 4. Three welds were prepared using different material combinations. For all welding the material was the same—aluminum coated press hardened steel—but the material dimensions were varied. In particular, a first weld was performed to join 56" wide by 0.080" thick material to 56" wide by 0.08" thick material. A second weld was performed to join 50" wide by 0.060" thick material to 50" wide by 0.060" thick material. A third weld was performed to join 56" wide by 0.080" thick material to 50" wide by 0.060" material. Adjustments were made to the normal shear knife clearances in order to shear and weld the lighter gauge material. After welding, the joined materials were sectioned.

Figure 10:
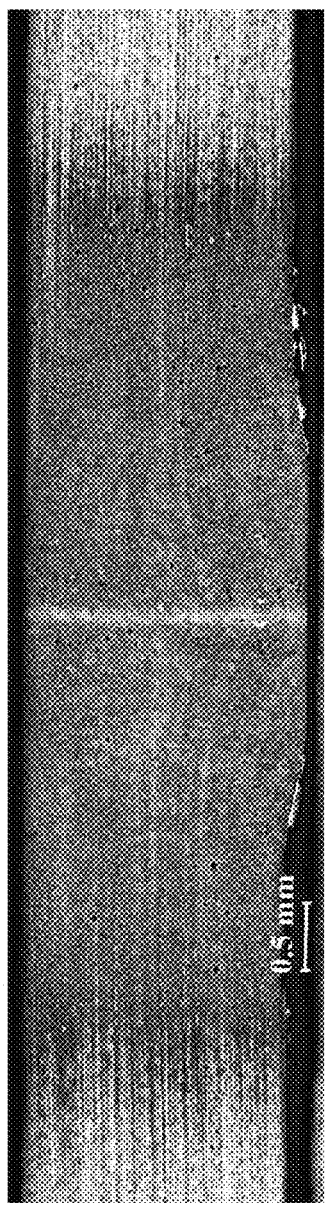
FIG. 10 depicts yet another photomicrograph of a weld cross-section, the weld formed using flash butt welding and the flash removed.
Figure 11:
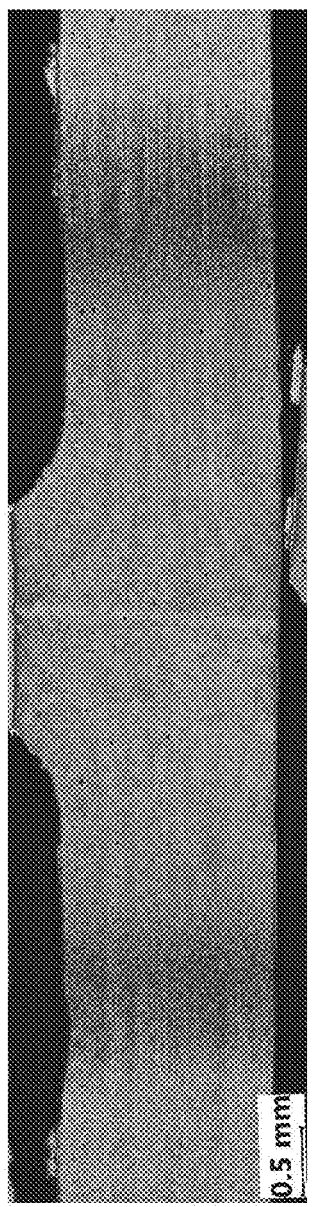
FIG. 11 depicts yet another photomicrograph of a weld cross-section, the weld formed using flash butt welding and the flash removed.
Figure 12:
FIG. 12 depicts yet another photomicrograph of a weld cross-section, the weld formed using flash butt welding and the flash removed.

Photomicrographs were prepared using the sections that were prepared after flash butt welding. In particular, FIG. 10 shows a photomicrograph of the first weld where 0.080" thick material was joined with 0.080" thick material. Similarly, FIG. 11 shows a photomicrograph of the second weld where 0.060" thick material was joined with 0.060" thick material. Finally, FIG. 12 shows a photomicrograph of a third weld where 0.060" thick material was joined with 0.080" thick material. All of FIGS. 10 through 12 show the weld after removal of the flash by scarfing. As can be seen, aluminum was generally not present in the weld fusion zone.

EXAMPLE 6

Welded coupons, 10.5" by 10.5", were cut from the lash butt welds made in Example 5. The completed coupons were then subjected to hot stamping tests simulating the lower part of an automotive B-Pillar on a small scale.

Figure 13:
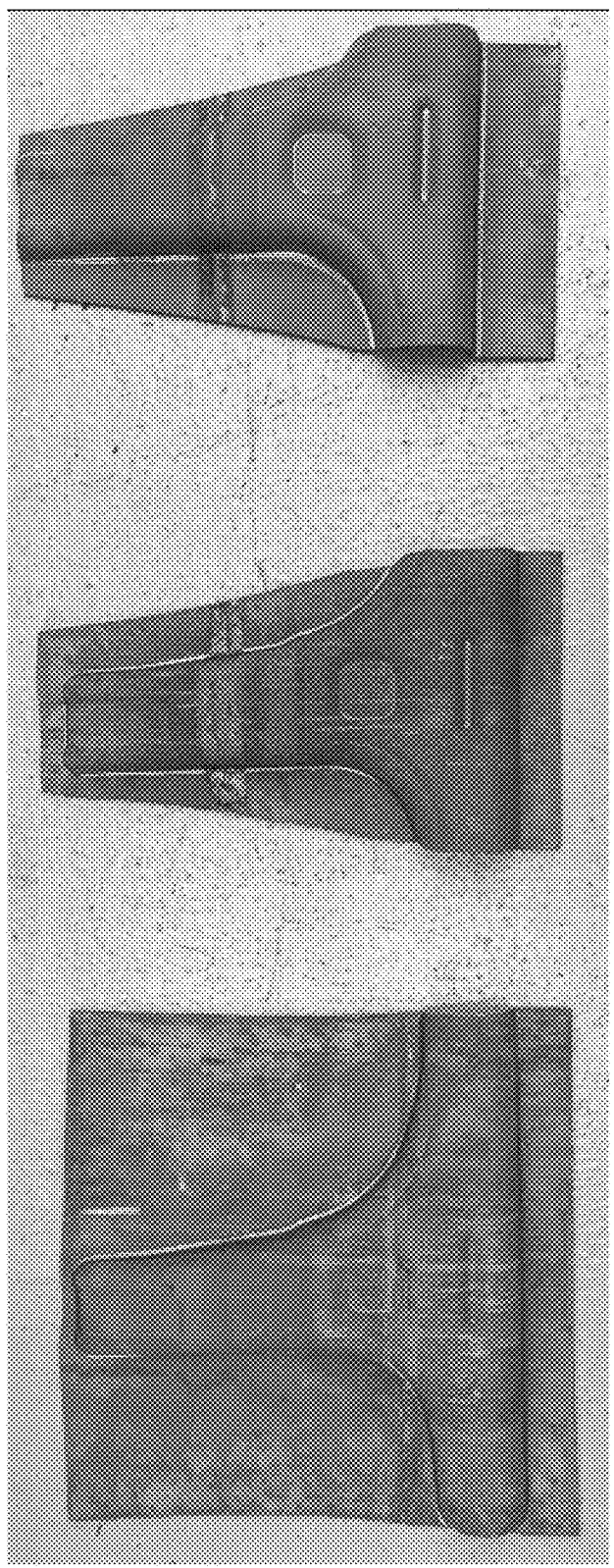
FIG. 13 depicts still another image of welds formed using flash butt welding, the welds subjected to hot stamping.
Figure 14:
FIG. 14 depicts yet another image of welds formed using flash butt welding, the welds subjected to hot stamping.

FIGS. 13 and 14 show the results of hot stamping. As can be seen, weld performance was acceptable after hot stamping using visual inspection.

What is claimed is:
1. A process for joining steel plate comprising the steps of:
providing a steel plate with at least one surface having an Al—Si coating; and
joining the steel plate to another material while the steel plate is in an as-coated condition using a forging process,
wherein the step of joining the steel plate includes displacing aluminum from the Al—Si coating away from the at least one surface of the steel plate and into a weld flash; and
scarfing the steel plate to remove flash from the steel plate after the step of joining the steel plate to the other material.
2. The process of claim 1, wherein the forging process of the step of joining the steel plate includes a flash butt welding process.
3. The process of claim 2, wherein the flash butt welding process includes heating the steel plate and forcing the steel plate into the other material to fuse the steel plate to the other material.
4. The process of claim 1, wherein the steel plate includes a first steel plate, wherein the other material includes a second steel plate, wherein the second steel plate has at least one surface with an Al—Si coating, wherein the step of joining the steel plate includes joining the first steel plate to the second steel plate using the forging process.

* * * * *